(12) United States Patent
Deixler et al.

(10) Patent No.: US 10,356,885 B2
(45) Date of Patent: Jul. 16, 2019

(54) INSTALLING AND COMMISSIONING TRANSCEIVERS COUPLED TO LOADS

(71) Applicant: SIGNIFY HOLDING B.V., Eindhoven (NL)

(72) Inventors: Peter Deixler, Eindhoven (NL); Leendert Teunis Rozendaal, Eindhoven (NL); Marco Haverlag, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/757,351

(22) PCT Filed: Aug. 23, 2016

(86) PCT No.: PCT/EP2016/069872
§ 371 (c)(1),
(2) Date: Mar. 3, 2018

(87) PCT Pub. No.: WO2017/036851
PCT Pub. Date: Mar. 9, 2017

(65) Prior Publication Data
US 2018/0242435 A1    Aug. 23, 2018

(30) Foreign Application Priority Data

Sep. 4, 2015    (EP) ..................................... 15183814

(51) Int. Cl.
*H05B 37/02* (2006.01)
*H04B 10/40* (2013.01)
(Continued)

(52) U.S. Cl.
CPC ..... *H05B 37/0272* (2013.01); *H04B 10/1143* (2013.01); *H04B 10/40* (2013.01);
(Continued)

(58) Field of Classification Search
CPC ..... H04L 63/10; H04L 63/102; H04L 63/104; H04B 10/1143; H04B 10/40
See application file for complete search history.

(56) References Cited

U.S. PATENT DOCUMENTS

2009/0129782 A1*    5/2009    Pederson ........... H04B 10/1143
                                                                    398/135
2012/0040606 A1    2/2012    Verfuerth
(Continued)

FOREIGN PATENT DOCUMENTS

WO    2004057927 A1    7/2004
WO    2008084356 A1    7/2008
(Continued)

*Primary Examiner* — Thuy V Tran

(57) ABSTRACT

The invention provides a lighting system which includes a lighting device, a remote database and a controller. The lighting device includes at least a transceiver which includes at least one identification information and at least one security information. The remote database contains the identification information and an associated security information for each lighting device. The controller is adapted to retrieve the identification information of the transceiver, to retrieve the associated security information from the remote database, and to then use the associated security information to enable secure communication between the controller and the lighting device.

14 Claims, 2 Drawing Sheets

(51) Int. Cl.
*H04B 10/114* (2013.01)
*H04L 29/06* (2006.01)

(52) U.S. Cl.
CPC ............ *H04L 63/10* (2013.01); *H04L 63/102* (2013.01); *H04L 63/104* (2013.01); *H05B 37/0218* (2013.01); *H05B 37/0227* (2013.01); *H05B 37/0281* (2013.01)

(56) References Cited

U.S. PATENT DOCUMENTS

| | | |
|---|---|---|
| 2013/0147366 A1 | 6/2013 | Huizenga et al. |
| 2014/0167623 A1 | 6/2014 | Chobot et al. |
| 2014/0239816 A1 | 8/2014 | Lee et al. |
| 2014/0265870 A1 | 9/2014 | Walma |
| 2014/0265920 A1 | 9/2014 | Pederson |
| 2014/0277805 A1* | 9/2014 | Browne, Jr. ........ H05B 37/0272 700/295 |
| 2015/0173154 A1* | 6/2015 | Faulkner ............ H05B 37/0218 315/149 |

FOREIGN PATENT DOCUMENTS

| | | |
|---|---|---|
| WO | 2010018538 A1 | 2/2010 |
| WO | 2010116287 A1 | 10/2010 |
| WO | 2013003813 A1 | 1/2013 |

\* cited by examiner

_US 10,356,885 B2_

INSTALLING AND COMMISSIONING TRANSCEIVERS COUPLED TO LOADS

CROSS-REFERENCE TO PRIOR APPLICATIONS

This application is the U.S. National Phase application under 35 U.S.C. § 371 of International Application No. PCT/EP2016/069872, filed on Aug. 23, 2016 which claims the benefit of European Patent Application No. 15183814.1 filed on Sep. 4, 2015. These applications are hereby incorporated by reference herein.

FIELD OF THE INVENTION

The invention relates to a controller for managing a transceiver, which transceiver is configured to be coupled to a load, and which transceiver is configured to form part of a network. The invention further relates to an installer device comprising such a controller, to a commissioner device comprising such a controller, to a transceiver configured to be managed by such a controller, to a load device comprising such a transceiver and further comprising the load, to a database for storing identification information and security information and for exchanging the identification information and the security information with the controller, and to a method for managing a transceiver. Such controllers form for example parts of installer devices and commissioner devices. Such installer devices and commissioner devices are for example smart phones with apps. Such transceivers are for example ZigBee™ transceivers, WiFi transceivers and 6LoWPAN transceivers. Such loads are for example street-lamps, environmental-sensors, ceiling-lamps, wall-switches and wall-dimmers.

BACKGROUND OF THE INVENTION

US 2014/0167623 A1 discloses commissioning for a lighting network, without discussing the security of the commissioning.

US2014/239816 discloses the use of a commissioning device that needs to store a database with connection information for connecting the different luminaire of the lighting network.

US2015/173154 discloses a lighting network of connected luminaire wherein a portable commissioning device is used for indicating which luminaire should be remotely control through an RF network.

US2014/265920 discloses a centralized lighting network using a portable device for installing a new lighting device in the lighting network.

US2014/277805 discloses a lighting network using RF communication for interconnecting all the devices including luminaire, several switch and also laptop or smartphone for commissioning the luminaires.

None of these documents provides a network that could be easily control by a local device with sufficient security for preventing any device to control a lighting network.

SUMMARY OF THE INVENTION

It is an object of the invention to provide an improved controller. It is a further object of the invention to provide a lighting system with a commissioner device, to provide a commissioner device, to provide a lighting device and to provide a corresponding improved method of light commissioning.

According to a first aspect, it is provided a lighting system comprising at least one lighting device, a remote database, and at least a controller. The at least one lighting device includes at least a transceiver coupled to a load, said transceiver comprising at least one identification information and at least one security information wherein said security information is used for securing the communication with the transceiver. The remote database stores the identification information and an associated identification information for each lighting device. The at least a controller for managing the transceiver. The controller comprises a first interface for a first communication with the transceiver, and a second interface for a second communication with a database. The controller is adapted to retrieve the identification information of the transceiver through the first interface. The controller is able to retrieve the associated identification information from the remote database through the second interface. Then, the controller can use the security information to secure the first communication.

A controller is provided for managing a transceiver of a lighting device. The lighting device can be a street-lamp, a ceiling-lamp, or a wall-switch for switching the ceiling-lamp, or a wall-dimmer for dimming the ceiling-lamp. Other loads are not to be excluded, in indoor applications (for example office-lighting) and in outdoor applications (for example street-lighting and parking-lot-lighting). The controller comprises a first interface for a first communication with the transceiver, and a second interface for a second communication with a database. Usually, these first and second communications will be communications according to different protocols, without having excluded that the first and second communications are communications according to the same protocol. The database is configured to store identification information and security information. The identification information is configured to identify the transceiver or a network comprising the transceiver. The transceiver is, in case of the network being identified, configured to form part of such a network.

A relatively small network may comprise the transceiver, possibly coupled to one or more loads, and the controller. A relatively large network may comprise several transceivers, each one possibly coupled to one or more loads, and the controller. The relatively large network may further comprise a bridge, a gateway or a border router. In all situations, the controller does not need to form part of the network all the time. For example during installing the transceiver, a controller having an installing function may form part of the network, and otherwise not. For example during commissioning the transceiver, a controller having a commissioning function may form part of the network, and otherwise not. This is for instance the case when the controller is used for securely configuring a time-based dimming schedule of one or more street-lights, with each street-light comprising an autonomous operation. Other examples are not to be excluded. In case of the relatively small network, the identification information identifies the transceiver. In case of the relatively large network, the identification information identifies the transceiver or identifies the network comprising the several transceivers. The security information is configured to secure the first communication.

As a result, the controller has become capable of exchanging, via the second communication, the identification information and the security information with the database. The identification information allows the transceiver or the network to which the transceiver belongs to be identified. The security information allows the first communication to be secured. Such an improved security is a great technical advantage.

Preferably, the database is configured to store the identification information and the security information in a linked way. Then, the security information can be specific security information for specific identification information.

An embodiment of the controller is defined, wherein the transceiver comprises a wireless transceiver and wherein the network comprises a wireless network and wherein the first communication comprises a first radio communication according to a first radio protocol, and/or wherein the second communication comprises a second radio communication according to a second radio protocol. Preferably, the transceiver is a wireless transceiver, and/or the first communication is a first radio communication according to a first radio protocol, and/or the second communication is a second radio communication according to a second radio protocol. Usually, the first and second radio protocols will be different radio protocols, without having excluded that the first and second radio protocols comprise the same radio protocol.

Preferably, to further improve a security, the second communication can be configured to take place via a so-called secure link, such as for example a https link, without having excluded other kinds of secure links. The security of the second network can be also linked directly to the network.

According to a preferred embodiment, the lighting system comprises an installer device for setting the identification information and the security information in the transceiver or in the remote database. The installer device is provided like the controller as defined above, wherein said managing comprises installing, and wherein the second interface is configured to exchange the identification information and the security information with the database, and wherein the first communication is secured via the security information or otherwise. The installer can be used when the security information is not set in the lighting device in the factory. According to a second aspect, a controller is provided for controlling at least one lighting device including at least a transceiver coupled to a load, said transceiver comprising at least one identification information and at least one security information wherein said security information is used for securing the communication with the transceiver. The controller comprises a first interface and a second interface. The first interface allows a first communication with the transceiver. The second interface allows a second communication with a remote database storing the identification information and an associated identification information for the at least one lighting device. The controller is adapted to retrieve the identification information of the transceiver through the first interface. The controller is adapted to retrieve the associated identification information from the remote database through the second interface. The controller is adapted to use the associated security information to secure the first communication.

The controller can be an installer device having an installing function for installing the transceiver (read: setting up/building a network comprising the transceiver, by for example grouping available transceivers, and/or by for example conditioning and/or configuring the transceiver at a basic, relatively low level). The second interface of the controller may send the identification information and the security information to the database, in case the controller has produced or received said identification information and said security information before. The second interface of the controller may receive the identification information and the security information from the database, in case the database has produced or received said identification information and said security information before. The first communication can be secured via the security information as soon as the security information is available at the transceiver. Thereto, the controller can forward the security information to the transceiver via a trigger signal in parallel to the first communication. Then, the first communication can be secured via the security information immediately. An example of such a trigger signal is a laser pointer signal (that is pointed to a day-light sensor of the transceiver or of a load coupled to the transceiver and that originates from a laser pointer on/near the installer device) or an infrared signal (that is pointed to an infrared receiver of the transceiver or of a load coupled to the transceiver and that originates from an infrared diode on/near the installer device), but other examples are not to be excluded. Or, the controller can forward the security information to the transceiver via the first communication that is secured in a prior art way. Then, the first communication can be secured via the security information as soon as the security information has become available at the transceiver.

An embodiment of the installer device is defined, wherein the installer device is configured to produce at least one of the identification information and the security information and to send said at least one of the identification information and the security information to the database, or wherein the installer device is configured to receive at least one of the identification information and the security information from the network or a unit and to send said at least one of the identification information and the security information to the database, or wherein the installer device is configured to receive at least one of the identification information and the security information from the database and to send said at least one of the identification information and the security information to the transceiver or the network. According to a first option, the installer device produces at least one of the identification information and the security information and sends said at least one of the identification information and the security information via its second interface to the database. According to a second option, the installer device receives at least one of the identification information and the security information from the network such as the transceiver or another transceiver or from a unit such as for example a memory stick and sends said at least one of the identification information and the security information via its second interface to the database. According to a third option, the installer device receives at least one of the identification information and the security information via its second interface from the database and sends said at least one of the identification information and the security information via its first interface or via the trigger signal to the transceiver or the network.

An embodiment of the installer device is defined, wherein the installer device is configured to produce an address or wherein the installer device is configured to receive the address from the transceiver, which address is configured to address the transceiver. An address to address the transceiver is not to be confused with the identification information. Said address may for example be a relatively unique and relatively constant address such as for example a media access control address and may for example be a relatively non-unique and relatively temporary address, without having excluded other kinds of addresses. Preferably, the installer device is configured to send the address to the database, for example to ease the communicating.

An embodiment of the installer device is defined, wherein the installer device is configured to install upon authorization from the database. Preferably, the database is configured to authorize the installing.

The controller can be a commissioner device, wherein said managing comprises commissioning, and wherein the second interface is configured to receive at least one of the identification information and the security information from the database, and wherein the first communication is secured via the security information. A commissioner device comprises a controller having a commissioning function for commissioning the transceiver (for example conditioning and/or configuring the transceiver and/or a load coupled to the transceiver at a non-basic, relatively high level). The second interface can receive at least one of the identification information and the security information from the database, owing to the fact that, during installing, the at least one of the identification information and the security information have been exchanged between the installer device and the database. The first communication can be secured via the security information, owing to the fact that, during the installing of the transceiver, the security information has been exchanged between the installer device and the transceiver.

An embodiment of the commissioner device is defined, wherein the commissioner device is configured to receive an order code for ordering the at least one of the identification information and the security information. The commissioner device receives an order code, such as for example a code entered by a user via a man-machine-interface of the commissioner device, or such as for example a code received from the transceiver after the commissioner device has triggered the transceiver, or such as for example a code received from a beacon, without having excluded other kinds of codes. In response to a reception of the order code, the commissioner device orders the at least one of the identification information and the security information. This way, the installer device and the commissioner device advantageously use the same identification information and the same security information stored in the database. The installer device and the commissioner device may be given the same authorization level or different authorization levels. Such an authorization level will be specific per network and will be defined/controlled by the database.

An embodiment of the commissioner device is defined, wherein the commissioner device is configured to produce an address or wherein the second interface is configured to receive the address from the database, which address is configured to address the transceiver. The address to address the transceiver may be the same as the one used by the installer device or may be a different one and is not to be confused with the identification information. Again, said address may for example be a relatively unique and relatively constant address such as for example a media access control address and may for example be a relatively non-unique and relatively temporary address, without having excluded other kinds of addresses.

An embodiment of the commissioner device is defined, wherein the commissioner device is configured to adapt a configuration of the load and/or the network. Such a configuration may comprise a load-setting and/or a network-setting. As an example only, the configuration can be an autonomous built-in time-based dimming schedule (e.g. in a street-light a light-output may be varied depending on a moment in time) or a configuration of an occupancy sensor or a day-light sensor of a transceiver or of a load coupled to the transceiver according to a space type (e.g. corridor, open office, conference room) or a definition of a response of the transceiver or of a load coupled to the transceiver to Automatic Demand Response signals sent by power utilities (e.g. via an Open Automatic Demand Response protocol) etc.

An embodiment of the commissioner device is defined, wherein the commissioner device is configured to commission upon authorization from the database. Preferably, the database is configured to authorize the commissioning. Further preferably, the database is configured to save commissioning results to prevent a loss of these results.

According to a third aspect, a lighting device is provided said lighting device comprising a transceiver coupled to a load, said transceiver comprising at least one identification information and at least one security information. The security information is used for securing the communication with the transceiver. The transceiver is adapted to send the identification information and adapted to set a secure communication based on the security information and configured to be managed by the controller as defined above.

According to a forth aspect, a method is provided for controlling lighting device comprising a transceiver coupled to a load, with a controller device comprising a first interface for communicating with the lighting device and a second interface for communicating with a remote database, wherein the transceiver comprises at least one identification information and at least one security information, wherein the remote data base stores the identification information and an associated identification information for said lighting device, wherein the method comprises the steps of:

sending identification information from the transceiver to the controller through the first interface of the controller, sending the associated security information from the remote database to the controller through the second interface, and securing the communication through the first interface with associated security information Embodiments of the method correspond with the embodiments of the controller, of the installer device and of the commissioning device. Preferentially, the security information and associated security information are used for encrypting the communication between the controller and the lighting device.

An example of the installer device and of the commissioning device is a smart phone or a tablet, with either an installing app to realize the installing function or with a commissioning app to realize the commissioning function. Such a smart phone or a tablet may be extended with a third interface, such as a laser pointer for sending a trigger signal to the transceiver, or such as a receiver for receiving the identification information and the security information from the transceiver (separately from the first communication, for example via a Near Field Communication possibility), or such as a receiver for receiving the code from the transceiver (separately from the first communication) or from the beacon, without having excluded other kinds of third interfaces. Such a smart phone or a tablet usually already has got a man-machine-interface and a Near Field Communication possibility.

A basic idea is that a controller for managing a transceiver should be able to do a first communication with the transceiver and a second communication with a database, which database should store identification information for identifying the transceiver or a network and security information for securing the first communication.

A problem to provide an improved controller has been solved. A further advantage is that installing and commissioning can be done more efficiently at reduced complexity and at reduced preparation time.

These and other aspects of the invention will be apparent from and elucidated with reference to the embodiments described hereinafter.

DETAILED DESCRIPTION OF EMBODIMENTS

Figure 1:
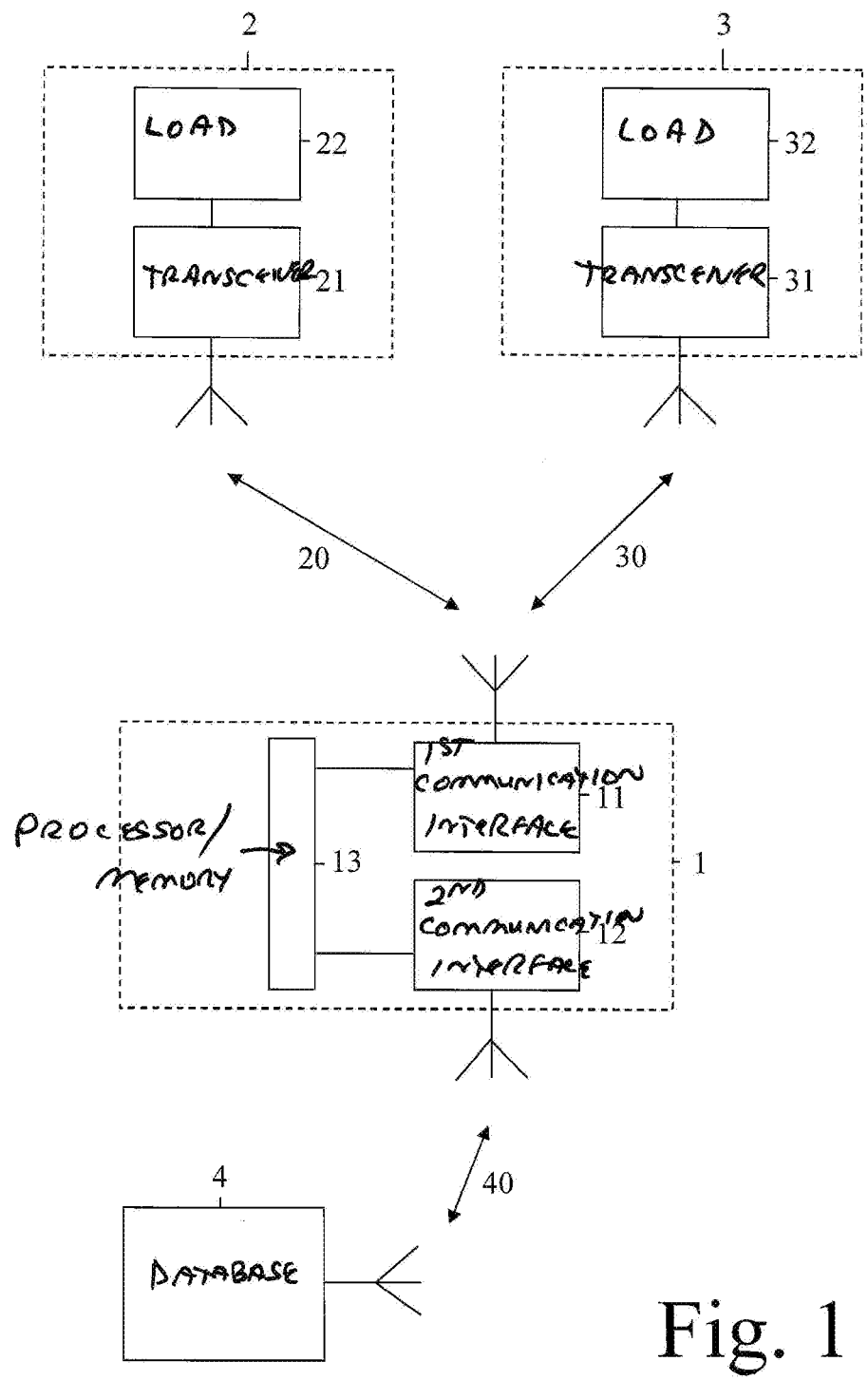
FIG. 1 shows a first embodiment of a controller and load devices.

In the FIG. 1, a first embodiment of a controller and load devices is shown. The controller 1 comprises a first interface 11 for a first communication via a link 20 (30) with a transceiver 21 (31) of a load device 2 (3). The controller 1 comprises a second interface 12 for a second communication via a link 40 with a database 4. In the load device 2 (3), the transceiver 21 (31) is coupled to a load 22 (32), such as for example a street-lamp, an integrated light-emitting-diode-luminaire, a ceiling-lamp, a wall-switch for switching the ceiling-lamp and a wall-dimmer for dimming the ceiling-lamp. In the controller 1, the first and second interfaces 11, 12 are coupled to a processor/memory 13. The database 4 is configured to store identification information and security information. The identification information is configured to identify the transceiver 21 (31) or a network comprising the transceiver 21 (31), and the security information is configured to secure the first communication.

Preferably, the transceiver 21 (31) comprises a wireless transceiver and the network comprises a wireless network, and the first communication via the link 20 (30) comprises a first radio communication according to a radio first protocol via a radio link, and/or the second communication via the link 40 comprises a second radio communication according to a second radio protocol via a radio link.

Figure 2:
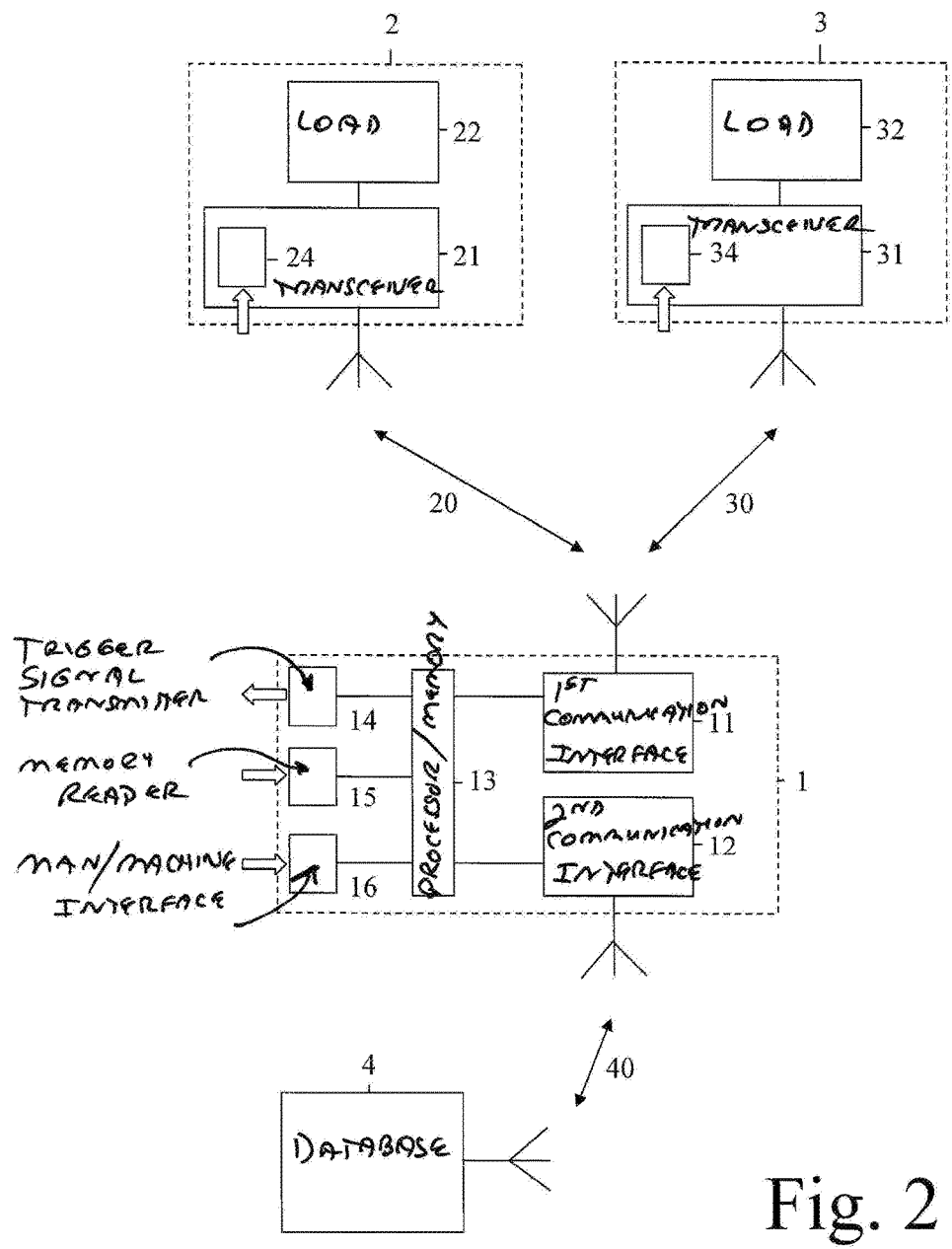
FIG. 2 shows a second embodiment of a controller and load devices.

In the FIG. 2, a second embodiment of a controller and load devices is shown. The second embodiment differs from the first embodiment in that the controller 1 further comprises a trigger signal transmitter 14 coupled to the processor/memory 13, a memory reader 15 coupled to the processor/memory 13, and a man-machine-interface 16 coupled to the processor/memory 13. Further, the second embodiment differs from the first embodiment in that in the load device 2 (3) the transceiver 21 (31) further comprises a trigger signal receiver 24 (34). Alternatively, the trigger signal receiver 24 (34) may be located outside the transceiver 21 (31) and be coupled to the transceiver 21 (31) and/or may form part of the load 22 (32) and be coupled to the transceiver 21 (31) and/or may form part of the load device 2 (3) and be coupled to the transceiver 21 (31).

The controller 1 may for example form part of an installer device, in which case said managing comprises installing (read: setting up/building a network comprising the transceiver, by for example grouping available transceivers, and/or by for example conditioning and/or configuring the transceiver at a basic, relatively low level). Such an installer device installs the transceiver 21. An example of such an installer device is a smart phone with an app having an installing function. Such an app shows for example a restricted number of buttons on a touch screen of the smart phone, like for example six buttons, preferably fewer, like five or four buttons. The trigger signal transmitter 14 may be realized via a data output of the smart phone, the memory reader 15 may be realized via a data input of the smart phone, and the touch screen is an example of the man-machine-interface 16. Another example of such a man-machine-interface 16 is a Near Field Communication interface. The second interface 12 is configured to exchange the identification information and the security information with the database 4, and the first communication is secured via the security information or otherwise, as follows.

According to a first option, the installer device is configured to produce at least one of the identification information and the security information. Thereto, for example a button "start new room" on the touch screen is pressed, and the trigger signal is transmitted to the load device 2, for example by pointing a laser pointer (trigger signal transmitter 14) to a light detector (trigger signal receiver 24). The trigger signal may comprise said at least one of the identification information and the security information, or said at least one of the identification information and the security information may be exchanged via the first communication following said trigger signal. In this case, the first communication may at first be secured in a prior art way, until said security information has reached the load device 2, from that moment on the first communication can be secured via said security information. The installer device may further be configured to send said at least one of the identification information and the security information to the database 4, such that the information can be used again at a later stage during commissioning. For a next luminaire/switch/dimmer in the same room, a button "add luminaire" or "add switch/dimmer" on the touch screen can be pressed etc.

According to a second option, the installer device is configured to receive at least one of the identification information and the security information from the network (the load device 2) or a unit (the memory, like a memory stick, to be read by the memory reader 15). Thereto, for example a button "start new room" on the touch screen is pressed, and the trigger signal is transmitted to the load device 2, for example by pointing a laser pointer (trigger signal transmitter 14) to a light detector (trigger signal receiver 24). The trigger signal may comprise said at least one of the identification information and the security information, when received from the unit, or said at least one of the identification information and the security information may be exchanged via the first communication following said trigger signal, when to be received from the network. In that case, the first communication may at first be secured in a prior art way, until said security information has reached the load device 2, from that moment on the first communication can be secured via said security information. Alternatively, said at least one of the identification information and the security information may be sent from the network to the installer device via a network-sender and a device-receiver not shown. The installer device is further configured to send said at least one of the identification information and the security information to the database 4, such that the information can be used again at a later stage during commissioning. For a next luminaire/switch/dimmer in the same room, a button "add luminaire" or "add switch/dimmer" on the touch screen can be pressed etc.

According to a third option, the installer device is configured to receive at least one of the identification information and the security information from the database 4 and to send said at least one of the identification information and the security information to the transceiver 21 or the network. Then, for example a button "start new room" on the touch screen is pressed, and the trigger signal is transmitted to the load device 2, for example by pointing a laser pointer (trigger signal transmitter 14) to a light detector (trigger signal receiver 24). The trigger signal may comprise said at least one of the identification information and the security information, or said at least one of the identification information and the security information may be exchanged via the first communication following said trigger signal. In that case, the first communication may at first be secured in a prior art way, until said security information has reached the load device 2, from that moment on the first communication can be secured via said security information. For a next luminaire/switch/dimmer in the same room, a button "add luminaire" or "add switch/dimmer" on the touch screen can be pressed etc.

Combinations of parts of said three options are possible too and not to be excluded. A fourth button "close room" may be pressed on the touch screen to finish the installing. For a load device 2 in the form of a street-lamp, other kinds of buttons may be introduced, such as setting a dimming-timing-schedule of a luminaire or defining a maximum light-output of a luminaire etc.

Preferably, the installer device may be configured to produce an address or the installer device may be configured to receive the address from the transceiver 21, via the first communication or via a barcode and a barcode reader or via a network-sender and a device-receiver not shown. Said address is configured to address the transceiver 21, and may for example be a relatively unique and relatively constant address such as for example a media access control address and may for example be a relatively non-unique and relatively temporary address, without having excluded other kinds of addresses. The installer device may be configured to send the address to the database 4, for easing the communicating. The installer device may further be configured to install upon authorization from the database 4, as further discussed below.

The installer device may be configured to send the network parameters of the network comprising the transceiver 21 to the database 4 as soon as the installer device has become part of this network (has entered this network), to prevent that in case the installer device has been removed from this network (has left this network) incorrectly, no network parameters are available in the database 4 for this network. Preferably, the database 4 orders/requests the end of the installing at the controller 1, and confirms the end of the installing to the controller 1.

The controller 1 may for example also form part of a commissioner device, in which case said managing comprises commissioning (for example conditioning and/or configuring the transceiver and/or a load coupled to the transceiver at a non-basic, relatively high level). Such a commissioner device commissions the transceiver 21. An example of such a commissioner device is a smart phone with an app having a commissioning function. Such an app shows for example a number of buttons on a touch screen of the smart phone. In a commissioner repair mode, these buttons may correspond with the buttons on the installer device. In a commissioner normal mode, the buttons will be different from the buttons on the installer device. Preferably, the number will be again a restricted number, like for example twenty buttons, preferably fewer, like fifteen or ten buttons. The trigger signal transmitter 14 may again be realized via a data output of the smart phone, the memory reader 15 may again be realized via a data input of the smart phone, and the touch screen is again an example of the man-machine-interface 16. The second interface 12 is configured to receive at least one of the identification information and the security information from the database 4, and the first communication is secured via the security information, as follows.

According to a first option, the commissioner device is configured to receive the identification information from the unit (the memory, like a memory stick, to be read by the memory reader 15). Thereto, for example a button "new commissioning" on the touch screen is pressed, and the unit is read out, or the unit is read out automatically after insertion. At the hand of the identification information, the commissioner device can retrieve the security information from the database 4. With the identification information and the security information being available at the commissioner device, it can communicate with the transceiver 21 and perform the commissioning.

According to a second option, the commissioner device is configured to receive an order code for ordering the at least one of the identification information and the security information. Such an order code may for example be a code entered via the man-machine-interface 16 of the commissioner device (e.g. a room number or a positioning coordinate of a load for example in the form of a street-light pole), or may for example be a code received from the transceiver 21 after the commissioner device has triggered the transceiver, or may for example be a code received from a beacon, or a code presented via a barcode and read via a barcode-reader, without having excluded other kinds of codes. In response to a reception of the order code, the commissioner device orders the at least one of the identification information and the security information at the database 4.

After the identification information and the security information have become available at the commissioner device, the commissioner device may start to search for nodes in the already existing (installed) network etc. And, just like the installer device, the commissioner device may be configured to send the network parameters of the network comprising the transceiver 21 to the database 4 as soon as the commissioner device has become part of this network (has entered this network), to prevent that in case the commissioner device has been removed from this network (has left this network) incorrectly, no network parameters or wrong network parameters are available in the database 4 for this network. Preferably, the database 4 orders/requests the end of the commissioning at the controller 1, and confirms the end of the commissioning to the controller 1.

Preferably, the commissioner device may be configured to produce an address or the commissioner device may be configured to receive the address from the database 4, which address is configured to address the transceiver 21. Said address is configured to address the transceiver 21, and may for example be a relatively unique and relatively constant address such as for example a media access control address and may for example be a relatively non-unique and relatively temporary address, without having excluded other kinds of addresses. The address will ease the communicating, and different addresses may allow different communicatings in parallel.

Preferably, the commissioner device may be configured to adapt a configuration of the load 22 and/or the network comprising the transceiver 21. Such a configuration may comprise a load-setting and/or a network-setting. An example of such a load-setting is a lighting control logic that defines for example responses to occupancy triggers and wall-switch triggers and/or that defines for example lighting scenes involving multiple luminaires like e.g. a presentation mode in a conference room whereby luminaires next to a screen are switched-off and the other luminaires are dimmed. Further, the commissioner device may be configured to commission upon authorization from the database 4, as discussed further below. Further preferably, the database is configured to save commissioning results to prevent a loss of these results in case the commissioning has not been finished properly.

Compared to a combined installer/commissioner device, the separate installer device and the separate commissioner device allow each device to become more user-friendly and to become easier to operate, and allow each device to be given the same authorization level or different authorization levels. Such an authorization level will be specific per network and will be defined/controlled by the database 4. Further, owing to the fact that the database 4 is involved, a use of a multitude of devices can be allowed or forbidden at the same time, and the commissioner device can join the network much more easier.

An audio jack of a smart phone comprises a combination of a data input and a data output that could be coupled to a dongle with a laser pointer (or any other kind of trigger signal transmitter such as for example an infrared transmitter or a normal light transmitter etc.) and a Zigbee™ radio (or any other kind of first interface 11, with the second interface 12 being realized through the smart phone's telephone/internet function). The database 4 may further store the (kind of) loads of the load devices, and the load-settings and the network-settings, and the authorization levels. The installer device and the commissioner device may communicate with the database 4 via secure links like https links. The secured first communication between controller 1 and transceiver 21, 31 has become much more secure compared to an intrinsic security of for example a Zigbee™ network that is generally considered to be less secure. The database 4 may further produce authorization codes that define the authorization levels. The transceivers 21, 31 may be configured to verify these authorization codes. Other examples are 6LoWPAN transceivers and Bluetooth™ transceivers, without having excluded further transceivers.

So, more generally, the database 4 may further store authorization information that for example defines an authorization level for an installer device and/or for a commissioner device, and/or that for example authorizes the installing and/or the commissioning, and the database 4 may further store privilege information, that for example defines a privilege for an installer device and/or for a commissioner device. The authorization information for example allows the commissioner device to change a certain light setting of a luminaire. For example one authorization level allows to modify a maximum current of a luminaire driver, while another lower authorization level allows only to select to trim an upper end of a dimming range of the luminaire, so that for example a 100% light output of the luminaire is defined at e.g. 80% of a maximum light output rating of the luminaire. This is done for instance to prevent over-lighting if the spacing of office luminaires is less than the office luminaire regular grid spacing. As another example, an authorization level of an installer device can depend upon the person who uses it. This way, a first installer person can install first kinds of environments, where a second installer person can install second kinds of environments, with the different kinds of environments being different in size or in location or in complexity etc. It is also possible that a same installer person has different access rights at different moments in time etc. (e.g. the installer person gets a time restricted access to perform a certain fix etc.) or that a same installer person must do the installing in a certain order etc. (e.g. the installer person gets a first access to do a first installment and, after being finished, gets an access to do a second installment etc.).

From an easy-of-market-adoption point of view and/or from an ease-of-use point of view: The installer device allows the grouping of transceivers to be done by "moderately-trained" installers, and the commissioner device allows the "advanced" commissioning portions to be done by "experts". During installment, the installer forms part of the network, upon completion of the grouping, network information is transferred from the installer device to the database (a central repository such as a cloud-based or on-premise server/device) and the installer device is removed from the network. The commissioner device retrieves the network information from the database and joins the already set up network without a presence of a bridge/gateway etc. being required or without a presence of the installer device being required.

In many prior art systems, during the commissioning, the installer device and the commissioner device need to be used simultaneously and at a relatively same location, which is a disadvantage. According to the solution in the FIGS. 1 and 2, a multitude of installer devices and a multitude of commissioner devices can be used at the same time, which is a great technical advantage.

When a "close room" button is pressed, the installer device may automatically transfer all relevant network information and a list of the transceivers added to this network and/or the loads coupled to these transceivers to the database.

A dongle of the commissioner device can make itself "factory new" and can join the already existing network, which was previously set up by the installer device. But, alternatively, the commissioner device could monitor the available networks (eave dropping) to find out which network it is. A list of the transceivers could be stored in the database or in the relevant transceivers that in that case should remember which transceivers are in the room. This could be programmed via the installer device at its "close room" operation.

Optionally, the commissioner device can be used in a "repair mode" to also make small corrections/modifications to the grouping of the transceivers as earlier done by the installer device, without the need to re-do all the grouping from scratch as required by prior art. In this repair mode, the commissioner device has the similar buttons like the installer device. However the commissioner device does not need to have a button to start setting up/building a new network, re-installing is done via the same or another installer device.

Another important use case for intelligent loads is re-visiting a standalone wireless load or a connect-ready network with a maintenance tool or a commissioning tool. There may be a need for a secure joining method for an additional controller other than the installer device which originally set up the network. Such an additional controller (e.g. a replacement installer device or a commissioner device) is to be added to an already existing network.

For a connect-ready network (comprising wireless luminaires without the presence of a bridge) or an individual wireless luminaire (such as a single configurable wireless luminaire), usually only resource-constrained components (relatively low digital processing power) are available to facilitate an easy-to-use and secure network joining of installer/commissioner devices. Hence, building a secure network joining mechanism for a connect-ready network (or an individual wireless luminaire) is more challenging than a secure network joining mechanism in a system where at least one part of the system is non-resource-constrained (e.g. a bridge).

In present prior art, the joining of a replacement device to an existing network is done in a non-secure fashion. For example, the existing Zigbee™ network of transceivers is open for any controller to join. Some systems offer an option of a PIN code to restrict access. However, the PIN code can be lost and provides only limited security.

The installer device may interact with factory-new virgin devices and may set up a network. The commissioner device may trigger a load to identify its ID (e.g. with a laser pointer pattern), or an indoor location service may be available (e.g. Low Power Wide Area Networks or iBeacons read out by smart phone-based devices).

The joining of the commissioner device to the network may be as follows: The commissioner device receives from the database the identification information (an extended PAN ID, Personal Area Network Identifier, to identify the network in a unique fashion) and the security information (a network key) and may from the database optionally also receive privilege information defining the privileges of the commissioner device when it comes to lighting controls and modification of the luminaire. The identification information and the security information alone are already sufficient for the commissioner device to communicate with any part of the network. Then the commissioner device may search for a parent node in the already existing network: The commissioner device may send beacon requests to find out which wireless nodes of the already existing network are within the proximity of the commissioner device, the transceivers respond to the beacon requests and the commissioner device receives their beacons. The commissioner device selects out of the responding transceivers those transceivers which are matching identification information (the extended PAN ID). The commissioning device may also just eave drop on the network's regular radio communication, from which it can be deduced which network it is. Then the commissioner device performs a network rejoin using the security information (the network key). The network rejoin may be encrypted with the security information such that there is proof that a sister device has been in the network before. The commissioner device selects a random network short address during sending out the network rejoin. The random network short address enables that multiple commissioner and installer devices can operate in parallel (e.g. at different times).

The solution shown in the FIGS. 1 and 2 allows the use of standard networking commands and is for example fully Zigbee™ 3.0 compatible.

Initial securing might be done through two independent https connections from the installer device and the commissioner device to the database without a need for shared secrets as is done in prior art systems. The installer device and the commissioner device are only allowed access to relevant parts of the database. Each network has its own local secret, that results in a limited localized damage if one of these secrets gets compromised.

The intrinsic network security of Zigbee™ involves global secret keys which are unfortunately known to any company making Zigbee™ products. These secrets are hence prone to leak and once leaked they affect all Zigbee™ devices of an interoperable profile (such as Zigbee™ Light-Link or Zigbee™ Home Automation). For example, especially for commissioner devices that can adjust parameters of luminaires, a highly secure fashion is absolutely necessary.

The solution shown in the FIGS. 1 and 2 also allows the joining of a smart phone to a connect-ready network of Bluetooth™ LED lamps and the joining of a smart phone to a non-IP connected bridge; for an IP connected bridge, many other (prior art) mechanisms are available.

Another embodiment may be an outdoor luminaire with a Bluetooth™ Low Energy radio unit (for luminaire configuration). Such an outdoor could be a part of a public network comprising a very large number of luminaires that need to be easily accessed by a large number of portable commissioning device and preventing any non-authorized access. Every Bluetooth™ Low Energy radio unit has its own private secret that is also known in a central data storage (from the time of manufacture of the luminaire). At the moment that the commissioning device connects with the luminaire, it retrieves the private secret from the database. By using a device-specific-key, it is not a problem if the device-specific-key is leaked as it just affects that one luminaire (and not all the luminaires as in case with a leaked global secret).

As an example, the device specific key could be a master key that is known by the luminaire and the central storage server. For simplifying the access the controller 1 used as commissioning device could be a simple smartphone with an application for controlling the luminaire wherein the luminaire could be controlled only through an encrypted communication using the Bluetooth communication. An example of communication can be as follow:

A first communication can be established between the smartphone and the transceiver of the luminaire using the Bluetooth communication. During this first communication the transceiver of the luminaire only transmits an identifier that could be a MAC address, a network address, a serial number, or any unique identifier that can clearly identify the luminaire in the lighting network. Preferentially, the identifier is sent together with a random number that is specific to the communication session.

Then the smartphone can contact a remote server through the phone network either using either the Short Message Service, or an internet access or any other channel available through a public communication network that enables an authentication of the smartphone. The Smartphone send the identifier to the remote server. The random number is preferentially sent together with the identifier.

The remote server can identify the smartphone to be authorized or not for controlling a luminaire and in particular the luminaire corresponding to identifier. If the smartphone is authorized then the server retrieve from a database a secret corresponding to the private secret of the luminaire for then providing a session key to the smartphone. Preferentially the session key is derived from both the secret and the random number.

The smartphone can then communicate with the luminaire using the session key for encrypting and decrypting the messages exchanged with the luminaire. The session key is then deleted after the end of the communication.

With such a solution it is difficult to intercept the communication between the luminaire and the smartphone. If an authorized smartphone is stolen, it is possible to revoke it at the remote server level only. Such a system can be more or less robust depending of the key used. As indicated, the session key can be based on random number but could be also based on the date or an access counter that do not need the exchange of an information.

Several implementation are possible, the master key can be a 128 bits key can be completed with the 128 bits random number forming a unique and temporary 256 bits number that could be transformed into a 128 bits session key using a Hash function. Then the 128 bits session key can encrypt or decrypt message using an AES-128 algorithm.

It is also possible to use an asymmetric key system using Public Key Infrastructure, in that case the remote data base and the luminaire will not store the same key but complementary keys. The security information and the associated security information could be other kind of complementary information for example for enabling a challenge-response between the transceiver 21, 31 and the controller 1. Any kind of pair of security information derived from one to each other can be used.

The securing of the access to the database can be made by the network or by a specific authentication of the commissioning device. The use of SMS enables to use the IMSI or the phone number that is unique in the mobile network for authenticating the smartphone to be an authorized one or not. Of course it could be also possible to use a more conventional authentication with login and password if the connection is made through internet. Many method can be used.

Summarizing, controllers 1 for managing transceivers 21, 31 comprise first interfaces 11 for first communications with the transceivers 21, 31 and second interfaces for second communications with databases 4 that store identification information for identifying the transceivers 21, 31 or networks comprising the transceivers 21, 31 and that store security information for securing the first communications. Via the second communications, the identification information and the security information can be exchanged. Installer devices comprise the controllers 1 such as a smart phone with an installing app for installing the transceivers 21, 31, and commissioner devices comprise the controllers 1 such as a smart phone with a commissioning app for commissioning the transceivers 21, 31. The installer devices and the commissioner devices may be given the same authorization level or different authorization levels. Such an authorization level will be specific per network and will be defined/controlled by the database 4.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting system comprising:
   at least one lighting device including at least a transceiver coupled to a load, said transceiver comprising at least one identification information and at least one security information wherein said security information is used for securing the communication with the transceiver;
   a remote database adapted to store the identification information and an associated security information for each lighting device;
   at least a controller for managing the transceiver wherein the controller comprises
   a first interface for a first communication with the transceiver, and
   a second interface for a second communication with the remote database,
   wherein the controller is adapted to retrieve the identification information of the transceiver through the first interface and the transceiver is adapted to send the identification information to the controller,
   wherein the controller is adapted to retrieve the associated security information from the remote database through the second interface, and
   wherein the controller is adapted to use the associated security information to enable secure communication between the controller and the lighting device and the transceiver is adapted to set a secure communication based on the security information.

2. The lighting system as defined in claim 1, wherein the transceiver comprises a wireless transceiver and wherein the first communication comprises a first radio communication according to a first radio protocol, and wherein the second communication comprises a second radio communication according to a second radio protocol.

3. The lighting system as defined in claim 1, wherein said lighting system comprises an installer device for setting the identification information and the security information in the transceiver or in the remote database.

4. The lighting system as defined in claim 3, wherein the installer device is configured to provide at least one of the identification information and the associated security information and to send said at least one of the identification information and the associated security information to the remote database, or wherein the installer device is configured to receive at least one of the identification information and the associated security information from a network or a unit and to send said at least one of the identification information and the associated security information to the remote database, or wherein the installer device is configured to receive at least one of the identification information and the associated security information from the remote database and to send said at least one of the identification information and the security information to the transceiver or a network.

5. The lighting system as defined in claim 1, wherein the identification information is comprised in the list of: a MAC address, a network address, a serial number, or any unique identifier.

6. The lighting system as defined in claim 1, wherein the security information and the associated security information are a same information comprised in the list of: a PIN code, a keyword, a symmetric encryption key, a master key.

7. The lighting system as defined in claim 1, wherein the security information and the associated security information are complementary information comprised in the list of: PKI infrastructure key pair, challenge-response information, or any derived information from one to the other.

8. The lighting system as defined in claim 1, wherein the controller comprises authentication information for accessing the remote database.

9. A controller for controlling at least one lighting device including at least a transceiver coupled to a load, said transceiver comprising at least one identification information and at least one security information wherein said security information is used for securing the communication with the transceiver, wherein said controller comprises
   a first interface for a first communication with the transceiver, and a second interface for a second communication with a remote database storing the identification information and an associated security information for the at least one lighting device, wherein the controller is adapted to retrieve the identification information of the transceiver through the first interface, wherein the controller is adapted to retrieve the associated security information from the remote database through the second interface, and wherein the controller is adapted to use the associated security information to enable secure communication between the controller and the lighting device.

10. A method for controlling lighting device comprising a transceiver coupled to a load, with a controller device comprising a first interface for communicating with the lighting device and a second interface for communicating with a remote database, wherein the transceiver comprises at least one identification information and at least one security information, wherein the remote data base stores the identification information and an associated security information for said lighting device, wherein the method comprises the steps of:

sending identification information from the transceiver to the controller through the first interface of the controller, sending the associated security information from the remote database to the controller through the second interface, and securing the communication through the first interface with the associated security information and the security information.

11. The method of claim 10, wherein the sending of the associated security information is made after a sending of the identification information from the controller to the remote database.

12. The method of claim 10, wherein the sending of associated security information is made after a sending of the identification information together with a random number from the controller to the remote database.

13. The method of claim 12, wherein the at least one security information is a master key and wherein the associated security information is a key derived from the master key and the random number.

14. The method of claim 10 wherein the security information and associated security information are a same key used for encrypting the communication between the controller and the lighting device.

* * * * *